June 16, 1942.  E. B. MILLER  2,286,920
AIR CONDITIONING SYSTEM
Filed Dec. 21, 1939  2 Sheets-Sheet 1
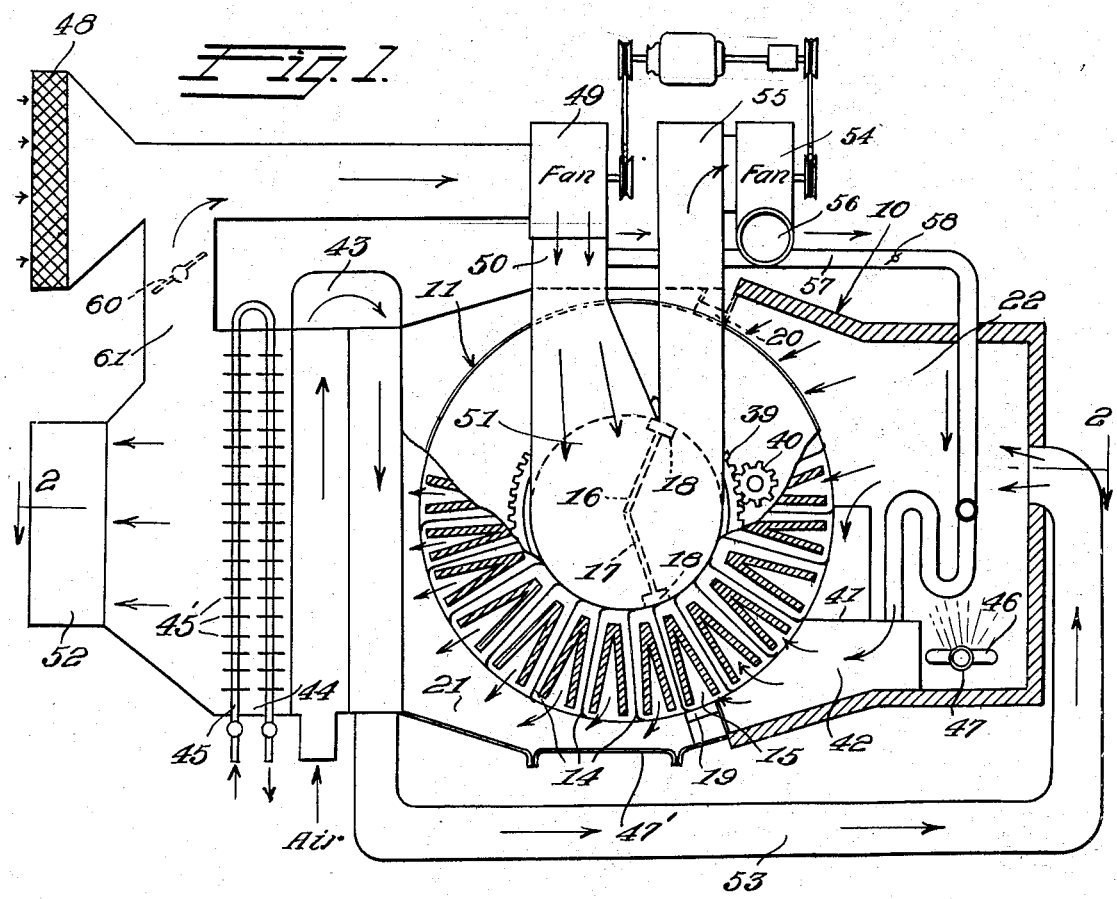
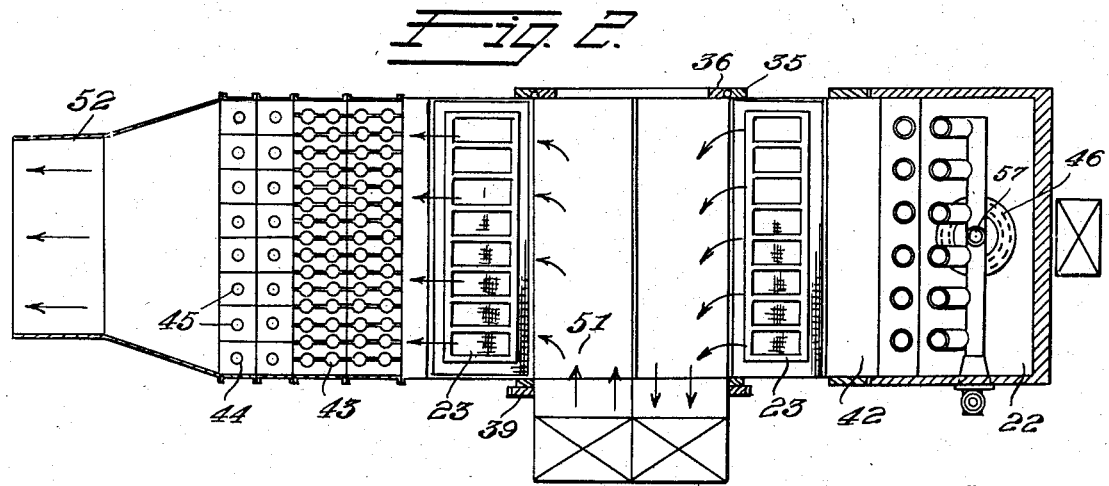
Inventor
Ernest B. Miller
By Wray N. Hoffman
Attorney

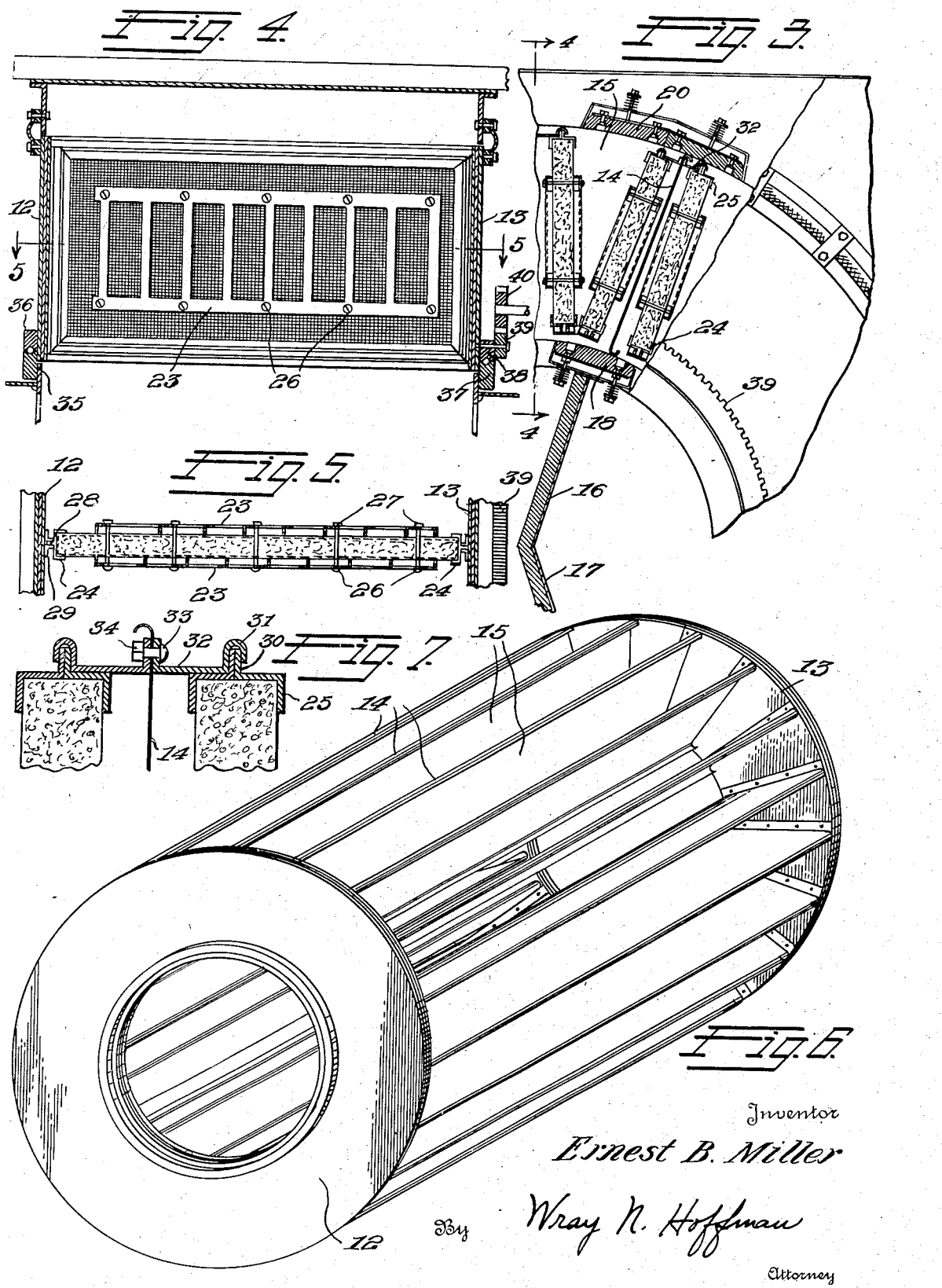

Patented June 16, 1942

2,286,920

UNITED STATES PATENT OFFICE 2,286,920

AIR CONDITIONING SYSTEM

Ernest B. Miller, Annapolis, Md., assignor to E. B. Miller Engineering Company, Inc., a corporation of Maryland Application December 21, 1939, Serial No. 310,453

5 Claims. (Cl. 183—4)

This invention relates to air conditioning, and more particularly to air conditioning systems of the adsorption type.

An object of the present invention is to provide a system for conditioning air in which the moisture content of the conditioned air is reduced by adsorption.

Another object of the present invention is to provide a system for conditioning air utilizing a solid adsorbent material which can be reactivated or revivified by the application of heat.

Another object of the present invention is to provide a continuous system for conditioning air wherein the air to be conditioned is caused to flow through a solid adsorbent material so as to extract moisture from the air, and wherein a gaseous medium is utilized to effect reactivation of the adsorbent material.

A further object of the present invention is to provide a continuous system for conditioning air wherein the air to be conditioned is caused to flow in one direction through a solid adsorbent material so as to extract moisture from the air, and wherein a gaseous medium flowing in the reverse direction is utilized to effect reactivation of the adsorbent material.

A further object of the present invention is to provide a continuous system for conditioning air in which an absorber unit of the rotary type carrying a solid adsorbent material is caused to travel progressively through an air conditioning chamber wherein moisture from the air to be conditioned is taken up or adsorbed by the adsorbent material, and then through reactivation and purging chambers in which the adsorbent material is revivified and restored for reuse in the air conditioning chamber.

A still further object of the present invention is to provide a continuous system for conditioning air in which an adsorber unit in the form of an annular cage having a plurality of pervious layers of solid adsorbent material arranged therearound is mounted for rotation about a horizontal axis, and is so disposed with relation to an air conditioning chamber, and reactivating and purging chambers that the cage in its course of travel passes progressively through the respective chambers.

A still further object of the present invention is to provide a continuous system for conditioning air employing a solid adsorbent material wherein the reactivation is effected by first contacting the adsorbent material with a gaseous medium of an elevated temperature to liberate the adsorbate, and then with a gas heated to an elevated temperature to purge the adsorbent material of any objectionable matter that may be present.

A still further object of the present invention is to provide a continuous system for conditioning air which enables the use of beds of solid adsorbent material having characteristics substantially like silica gel or the gel of other activated hydrous oxides of a thickness of approximately ¾ of an inch or less and made up of particles of such size that will pass through a 14 mesh screen and be retained on a 20 mesh screen.

A still further object of the present invention is to provide a continuous system for conditioning air which is highly efficient and reliable in operation, and which is adapted to condition air relatively inexpensively.

Other objects and features of the present invention will be more apparent from the following description taken in conjunction with the accompanying drawings, wherein Figure 1 is a diagrammatical elevational view, partly in section, representing an air conditioning system in accordance with the invention.

Figure 2 is a horizontal section taken substantially on the line 2—2 of Figure 1.

Figure 3 is an enlarged fragmental view, partly in end elevation and in section, showing the structure and arrangement of the layers of adsorbent material within the annular cage of the adsorber unit.

Figure 4 is a transverse section on the line 4—4 of Figure 3.

Figure 5 is a section taken on the line 5—5 of Figure 4.

Figure 6 is an enlarged perspective view of the annular cage of the adsorber unit.

Figure 7 is an enlarged fragmental view of the upper portion of the partition strip and adjacent adsorbent layer units of Figure 3 showing the means for connecting the units and strip together.

Referring to the drawings, the numeral 10, Figure 1, designates a casing within which is mounted an adsorber unit 11 for rotation about a horizontal axis. The adsorber unit is in the form of an annular cage and comprises annular rings 12 and 13, Figures 1 and 6, between which are disposed a plurality of radially arranged partition strips 14 suitably spaced from each other so as to form a series of open ended compartments 15 therein. Each of these strips is preferably made of spring steel and is provided with curved ends as clearly shown in Figures 1 and 3.

Fixedly positioned with the annular cage, Figure 1, are radially disposed plates 16 and 17, each of which carries at its radially outer end a seal 18 for cooperation with the radially inner ends of the partition strips 14 of the annular cage. Both of the seals 18 are of the same construction and as shown in Figure 3 are resiliently mounted. Furthermore, they are of a width sufficient that at least one of the two adjacent radially inner ends of the strips is in constant engagement with each of the seals to form a gas-tight fit. Fixedly mounted within the casing 10 and arranged in radial alignment and complemental to each of the seals 18 are seals 19 and 20 for cooperation with the outer ends of the partition strips 14. These latter seals 19 and 20 are likewise of the same construction, and as shown in Figure 3 are resiliently mounted. Also, the seals 19 and 20 are a width sufficient that at least one of the two adjacent radially outer ends of the strips are in constant engagement therewith to form a gas tight seal. The plates 16 and 17, seals 18, and seals 19 and 20 cooperate with the partition strips 14 to define a dehydrating chamber 21 and a reactivating chamber 22.

Mounted within each of the compartments 15, Figure 1, are two pervious layers of solid adsorbent material arranged in a radially outwardly diverging relationship. Each layer, Figures 3, 4, and 5 is assembled as a unit and comprises two foraminous grid plates 23 arranged in spaced relation and supported between bottom and top channel members 24 and 25, solid adsorbent material disposed between the grid plates, and headed bolts 26 passing transversely through the grid plates and locked thereto by means of nuts 27. The bottom channel member 24 is provided with a leg 28 projecting into a U-shaped flange member 29 of the annular cage and supported therein. The top channel member 25 is also provided with a leg 30, Figure 7, which projects into a U-shaped flange 31 of a cap plate 32, the cap plate being detachably secured to the adjacent partition strip 14 by means of a bolt 33 passing through the cap plate and partition strip and secured thereto by means of a nut 34.

The solid adsorbent material employed may be an adsorbent having characteristics substantially like silica gel or the gel of other activated hydrous oxides. Preferably, silical gel is used. In making the pervious layer of solid adsorbent material particles of silica gel are used which are of such size that they will pass through a 14 mesh screen and be retained on a 20 mesh screen. Also, the spacing of the grid plates 23 is so arranged as to form a thin layer which is of uniform thickness throughout, preferably of a thickness of approximately ¾ of an inch or less. The use of a layer made up of gel particles of 14 to 20 mesh and of a thickness of ¾ of an inch or less is more effective in adsorption efficiency due to the great rapidity with which it gives up heat to the passing stream of air to be dehydrated.

To the outer surface of the annular ring 12, Figure 4, is fixedly secured a circular ball race member 35 on which is mounted for movement therearound a circular table 36. Fixedly secured to the exterior surface of the annular ring 13 is also a circular ball race member 37 on which is mounted for movement therearound a circular table 38, which carries a circular gear track 39 in mesh with a pinion 40 driven by any suitable mechanism not shown. The pinion 40 may be driven in either clockwise or counter-clockwise direction. With the device as shown in Figure 1 the pinion is driven in a counter-clockwise direction.

Disposed within the reactivating chamber 22, Figure 1, and suitably spaced from the seal 19 is a partition member 41 for cooperation with the outer ends of the partition strips 14 of the annular cage. This partition member 41 and seal 19 cooperate with the partition strips to form a purging chamber 42.

Vertically disposed within the dehydrating chamber 21, Figure 1, adjacent the adsorber unit 11, is a heat exchanger 43 through which is introduced the air required for use in the reactivating chamber 22, such air being delivered to said chamber by conduit 53. Arranged within the dehydrating chamber 21 adjacent to the heat exchanger 43 is an after cooler 44 comprising a vertically disposed fluid conduiting coil 45, said coil being provided with a plurality of heat conducting fins 45' protruding from the exterior thereof. The fluid such as water or air is preferably caused to pass into the section of the coil 45 farthest away from the adsorber unit 11 through the inlet which is positioned adjacent the top of the dehydrating chamber 22 and out of the section nearest the adsorber unit through the outlet which is located adjacent the bottom of such chamber. This manner of circulation has the advantage in that a given amount of cooling water removes a much greater quantity of heat from the dehydrated air.

As shown in Figures 1 and 2 a burner 46 is disposed within the reactivating chamber 22 to which is supplied a suitable fuel from a source of supply not shown. It is preferred to use a gaseous or liquid fuel which can be brought to the burner through the pipe 47.

The dehydrating chamber 21, Figure 1, is provided with a door 47' for access to the adsorber unit in the event that replacement of any of the pervious layer units containing solid adsorbent material is necessary.

Referring to Figure 1 with the adsorber unit rotating in a clockwise manner, air to be conditioned enters the filter 48 which removes mechanical impurities therefrom to protect the adsorbent material and is delivered to the fan 49 which places it under sufficient pressure to deliver it into the duct 50. The duct 50 in turn delivers the air into the inner hollow sector 51 of the annular cage of the adsorber unit 11 which is within the confines of the dehydrating chamber 21. The sector 51 is defined by the radial plates 16 and 17 and the seals 18 carried by the ends thereof.

From the interior of the sector 51 the air enters the open ended compartments 15 in multiple which are travelling through the dehydrating chamber 21 and passes through the pervious layers of solid adsorbent material contained in each compartment. In passing through these layers the air is deprived of its moisture by virtue of it being adsorbed within the pores of the adsorbent material. The dehydrated air passes out of these compartments through its opposite ends into the surrounding space of the dehydrating chamber from which it is brought into indirect contact with a heat exchanger 43 through which atmospheric air of ordinary temperature for use in the reactivating chamber is flowing therethrough. The bringing of the dehydrated air into indirect contact with the heat exchanger 43 results in the extraction of a portion of its heat of adsorption therefrom.

The dehydrated air with part of its heat of adsorption removed is next brought into indirect contact with the after cooler 44 through which a cooling fluid of the predetermined temperature is caused to flow, the direction of flow being into the section of the coil 45 farthest away from the adsorber unit 11 through the inlet which is positioned adjacent the top of the dehydrating chamber and out of the section of the coil nearest the adsorber unit through the outlet which is located adjacent the bottom of such chamber. The passage of the dehydrated air through the after cooler removes the remaining portion of the heat of adsorption and cools the air to the required temperature. From the after cooler the conditioned air is discharged from the dehydrating chamber through the outlet duct 52.

The compartments 15 of the annular cage of the adsorber unit 11 leaving the dehydrating chamber 21 are brought into the reactivating chamber 22. During the course of travel of these compartments through the reactivating chamber a hot gaseous medium enters through their outer open ends and passes through the pervious layers of solid adsorbent material contained therein. In passing through these layers the gaseous medium heats the adsorbent material comprising the layers and drives off the adsorbed moisture, the partially cooled gaseous medium and its burden of moisture being discharged through the inner ends of the compartments into a fan 54 by means of a duct 55. From the fan 54 it is discharged through the conduit 56 to the atmosphere.

The hot gaseous medium for this reactivation of the adsorbent material is produced by the combustion of any suitable fuel in the reactivating chamber 22. It is preferred, however, to burn a gaseous or liquid fuel which can be brought to the reactivating chamber through the pipe 47. Air for supporting combustion of the fuel is brought to the reactivating chamber through heat exchanger 43 and conduit 53, and this air is preheated as a result of passing through the heat exchanger in indirect contact with the dehydrated air flowing toward the outlet duct 52. Thus, the gaseous medium comprises air containing the products of combustion.

The compartments 15 of the annular cage of the adsorber unit 11 which have just left the reactivating chamber 22 are brought into the purging chamber 42. The adsorbent material of the layers contained in these compartments are hot and filled with burned gases from the reactivating chamber and in order to remove these gases and partially cool the layers before they move into position for use again in the dehydrating chamber, heated air of substantially the same or slightly lower temperature than that of the gaseous medium employed in the reactivating chamber is passed through these layers from the outer to the inner ends of the compartments containing them. This may be readily effected by tapping off a pipe 57 from the air duct 50 and leading it through the reactivating chamber into the purging chamber 42. The air in passing through the pipe 57 has its temperature considerably raised due to indirect contact with the gaseous medium in the reactivating chamber. The pipe 57 is provided with a damper 58 which gives positive control over the quantity of air delivered to the purging chamber from the air duct 50. The purging air passing from the inner ends of the compartments within the purging chamber is discharged into the fan 54 by means of the duct 55. From this fan it is delivered to the atmosphere through the conduit 56.

The use of heated air of substantially the same or slightly lower temperature than that of the gaseous medium employed for reactivation as the purging air has the advantage in that the adsorptive capacity of the adsorbent material is not wastefully used up before it reaches the adsorption stage in the dehydrating chamber. If air at room temperature were used as the purging air the adsorbent material would at once begin to adsorb moisture from the purging air, thereby resulting in partial impairment of the adsorptive capacity for moisture of the adsorbent material before it is advanced to the adsorption stage in the dehydrating chamber.

If desired, part of the conditioned air may be admixed with the incoming air to be dehydrated. This may be effected by opening the damper 60 to the desired extent in the conduit 61. The admixing of conditioned air with the incoming air produces a dehydrated air of lower moisture content that that of the dehydrated air obtained by the passage of fresh air exclusively through the conditioning system. It is to be noted that on certain days the outside air is so saturated with moisture that it would be impossible to reduce the same to the degree desired for inside room conditions without resorting to this admixture.

Although only one modification of the air conditioning system embodying the invention has been shown and described, it is to be understood that various changes and modifications may be made herein without departing from the spirit of the invention and scope of the appended claims.

Having fully described the invention, what I claim as new and desire to secure by Letters Patent is:

1. In an air conditioning system, a casing, an annular cage mounted in said casing for rotation about a horizontal axis and having a plurality of radially arranged partitions forming a series of open ended compartments therein, a pervious layer of solid adsorbent material in each of said compartments, stationary means engaging the inner and outer peripheries of said annular cage and cooperating with the partitions of said cage to divide said casing into a dehydrating chamber and a reactivating chamber, means for delivering air to be dehydrated through the compartments while travelling through the dehydrating chamber to thereby cause the adsorbent material to extract moisture from the air by adsorption, means for passing a gaseous medium in heat exchanging relationship with the dehydrated air to effect preheating thereof, means for further heating said gaseous medium to a relatively high temperature, means for delivering said gaseous medium through the compartments while travelling through the reactivating chamber, and means to circulate a cooling fluid in indirect contact with the dehydrated air before discharge from the dehydrating chamber to cool the same.

2. An adsorber comprising, in combination, an annular cage mounted for rotation about a horizontal axis and having a plurality of radially arranged partitions forming a series of compartments open at their radially outer ends, a plurality of adsorbent cells insertable into and removable from said compartments through the open radially outer ends thereof, means on said cage for supporting at least two of said cells within each of said compartments in a radially outwardly diverging relationship, and detachable means for fixedly retaining said cells in their supported position in each of said compartments.

3. An adsorber comprising, in combination, an annular cage mounted for rotation about a horizontal axis and having a plurality of radially arranged partitions forming a series of compartments open at their radially outer ends; an adsorbent cell insertable into and removable from each of said compartments through the open radially outer end thereof, each cell comprising foraminous grid plates interposed between top and bottom channel members secured together in spaced relation to each other, and solid adsorbent material disposed between said grid plates, means on said cage for radially supporting a cell within each of said compartments, and detachable means in association with the top channel member of each of the supported cells and the adjacent partition for fixedly retaining said cell in position.

4. An adsorber comprising, in combination, an annular cage mounted for rotation about a horizontal axis and having a plurality of radially arranged partitions forming a series of compartments open at their radially outer ends, an adsorbent cell insertable into and removable from each of said compartments through the open radially outer end thereof, each cell comprising foraminous grid plates interposed between top and bottom channel members secured together in spaced relation to each other, and solid adsorbent material disposed between said grid plates, means embodying spaced radially arranged flange members on said cage for receiving the bottom channel members of said cells to support a cell within each of said compartments, and detachable means in association with the top channel member of each of the supported cells and the adjacent partition for fixedly retaining said cell in position.

5. An adsorber comprising, in combination, an annular cage mounted for rotation about a horizontal axis and having a plurality of radially arranged partitions forming a series of compartments open at their radially outer ends, an adsorbent cell insertable into and removable from each of said compartments through the open radially outer end thereof, each cell comprising foraminous grid plates interposed between top and bottom channel members secured together in spaced relation to each other, and solid adsorbent material disposed between said grid plates, means embodying spaced flange members radially arranged on said cage intermediate each of said compartments for receiving the bottom channel member of said cells to support at least two of said cells in a radially outwardly diverging relationship in each compartment, and detachable means embracing the top channel member of each of the supported cells and the adjacent partition for fixedly retaining said cells in position.

ERNEST B. MILLER.